June 26, 1956     T. N. SAATY     2,752,135

FUEL INJECTING DEVICE FOR INTERNAL COMBUSTION ENGINE

Filed May 28, 1952     4 Sheets-Sheet 1

INVENTOR.
Theodore N. Saaty
BY Barlow & Barlow
ATTORNEYS.

June 26, 1956  T. N. SAATY  2,752,135
FUEL INJECTING DEVICE FOR INTERNAL COMBUSTION ENGINE
Filed May 28, 1952  4 Sheets-Sheet 2
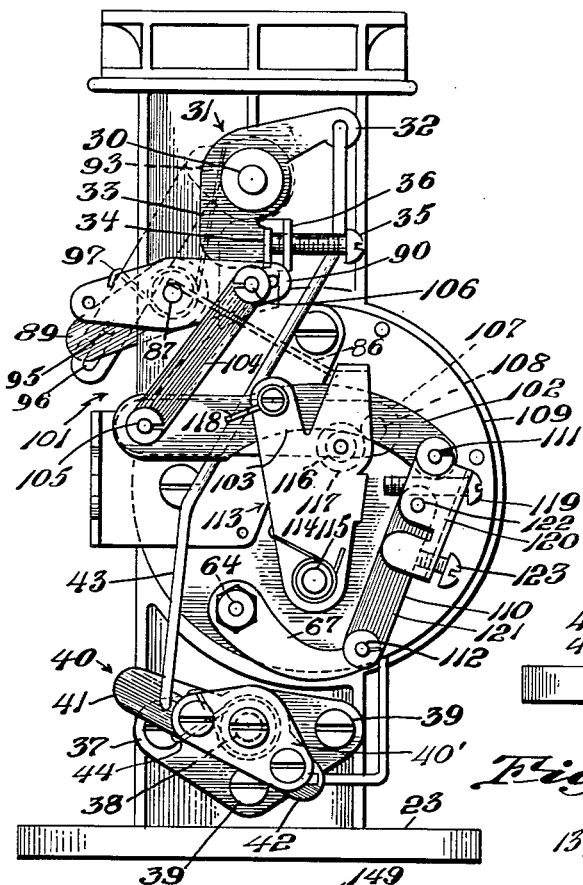
INVENTOR.
Theodore N. Saaty
BY
Barlow & Barlow
ATTORNEYS.

June 26, 1956 T. N. SAATY 2,752,135
FUEL INJECTING DEVICE FOR INTERNAL COMBUSTION ENGINE
Filed May 28, 1952 4 Sheets-Sheet 3
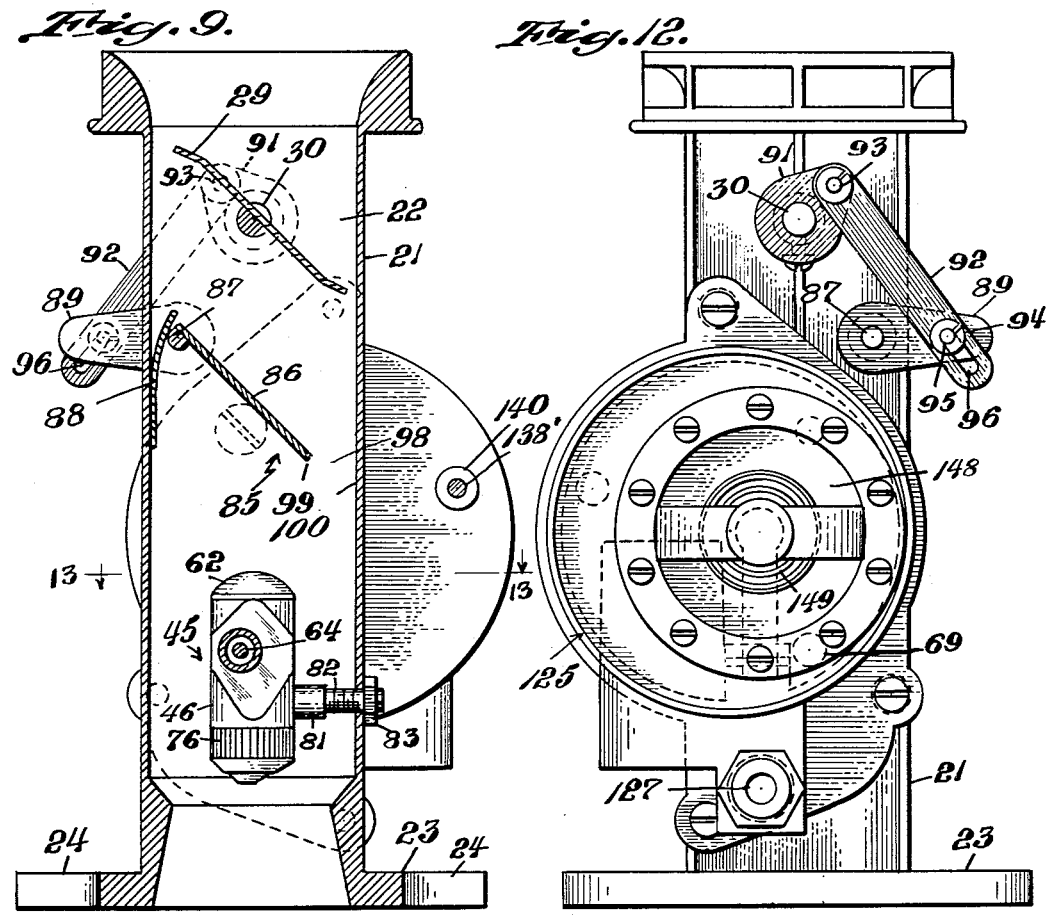
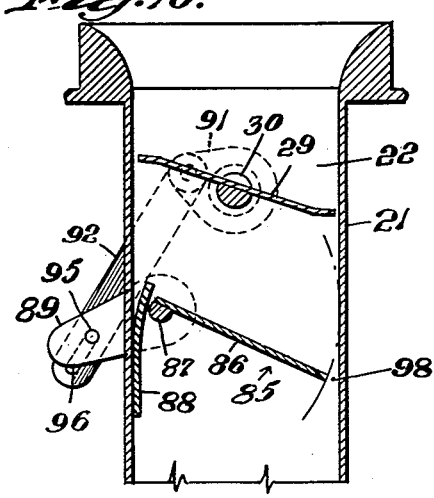
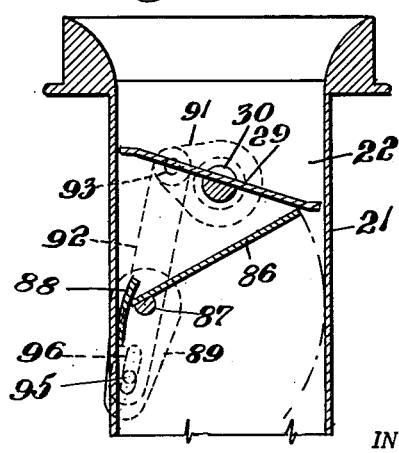
INVENTOR.
Theodore N. Saaty
BY
Barlow & Barlow
ATTORNEYS.

June 26, 1956 T. N. SAATY 2,752,135
FUEL INJECTING DEVICE FOR INTERNAL COMBUSTION ENGINE
Filed May 28, 1952 4 Sheets-Sheet 4
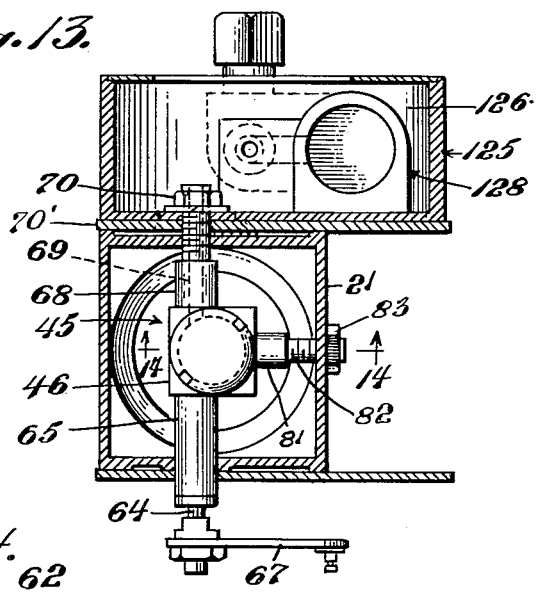
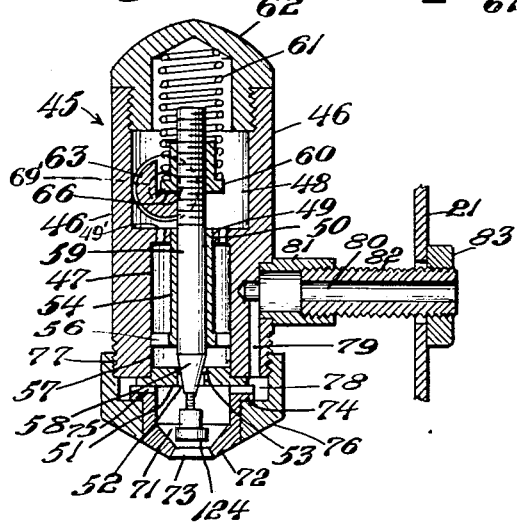
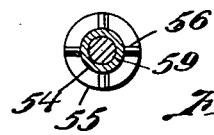
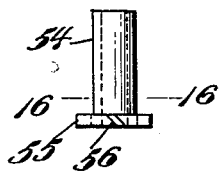
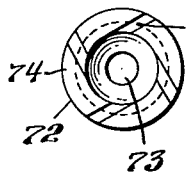
INVENTOR.
Theodore N. Saaty
BY
Barlow & Barlow
ATTORNEYS.

United States Patent Office 2,752,135
Patented June 26, 1956

2,752,135

FUEL INJECTING DEVICE FOR INTERNAL COMBUSTION ENGINE

Theodore N. Saaty, Providence, R. I.

Application May 28, 1952, Serial No. 290,399

13 Claims. (Cl. 261—39)

This invention relates to a fuel atomizer of the pressure ejecting type for an internal combustion engine.

The general object of the invention is to provide for better engine performance at all engine speeds and loads placed thereon.

Another object of the invention is to provide a device of this character in which the mixture of liquid fuel and air will be maintained at a predetermined ratio throughout the entire range of throttle adjustment.

Another object of the invention is to provide a device of this character in which the mixture of liquid fuel and air will be controlled from the volume of air flowing through the device.

Another object of the invention is to deliver the liquid fuel at a location of reduced pressure to better vaporize the same.

Another object of the invention is to provide a device of this character in which the liquid fuel and air ratio will be varied in response to engine temperature.

Another object of the invention is to provide a device of this character in which the ratio of liquid fuel to the air will be maintained at one value at the upper engine speeds without affecting different fuel ratios at a lower engine speed.

Another object of the invention is to provide a device of this character so constructed as to provide for adjusting the fuel ratio at the engine idling position without affecting the fuel and air ratio at the upper engine speeds.

With these and other objects in view, the invention consists of certain novel features of construction, as will be more fully described and particularly pointed out in the appended claims.

In the accompanying drawings:

Figure 4 is an elevational view similar to that shown in Figure 3 with certain supporting structure omitted and showing the position of certain elements thereof in a different relation than that shown in Figure 3;

Figure 5 is an end elevational view of a fragmental portion of the opposite side of the device;

Figure 6 is a top plan view of the device as shown in Figure 4;

Figure 7 is a sectional view of the reservoir taken substantially along line 7—7 of Figure 6;

Figure 9 is a sectional view taken substantially along line 9—9 of Figure 6;

Figures 10 and 11 are sectional views of the upper portion shown in Figure 9 but showing elements thereof in different operating positions;

Figure 12 is an elevational view of the device showing the opposite side thereof to that shown in Figure 9;

Figure 13 is a sectional view taken substantially along line 13—13 of Figure 9 showing the position of the fuel nozzle of the device relative to the air conduit and to the fuel reservoir;

Figure 14 is a sectional view on line 14—14 of Figure 13 through the fuel nozzle;

Figure 15 is an elevational view of one of the elements of the fuel nozzle;

Figure 16 is a sectional view taken substantially along line 16—16 of Figure 15; and Figure 17 is a top plan view of a further element of the fuel nozzle.

Figure 1:
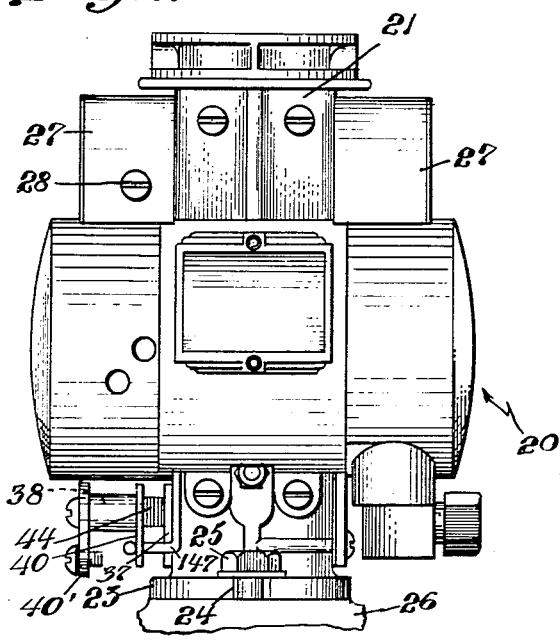
Figure 1 is a side elevational view of a fuel injector device embodying my invention.
Figure 2:
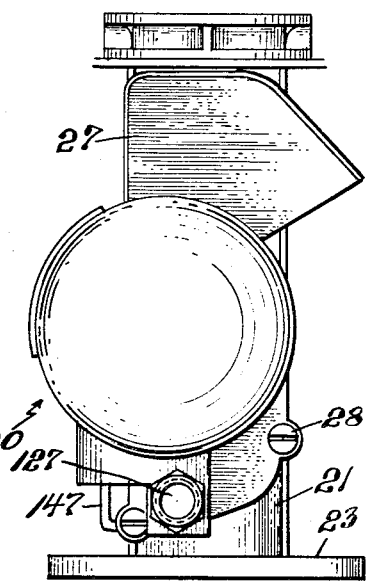
Figure 2 is an end elevational view of the device shown in Figure 1.

Referring to the drawings, 20 (Figures 1 and 2) designates a fuel atomizer of the ejector type having an elongated, hollow body 21 (see Figures 9, 10, and 11) which is open at both ends and generally rectangular in cross section (see Figure 13). The body is provided at its lower extremity with a generally right angularly extending flange 23 which is shown as being slotted as at 24 for receiving tie bolt 25 (see Figure 1) for securing the device in place on the manifold 26 of an internal combustion engine which provides for a flow of air through said conduit 22 by means of engine suction, as is usual in devices of this character. The movable elements of the device may be enclosed by means of closures 27 (see Figures 1, 2) which are attached to the body 21 in any appropriate manner, such as by means of screws 28.

Figure 3:
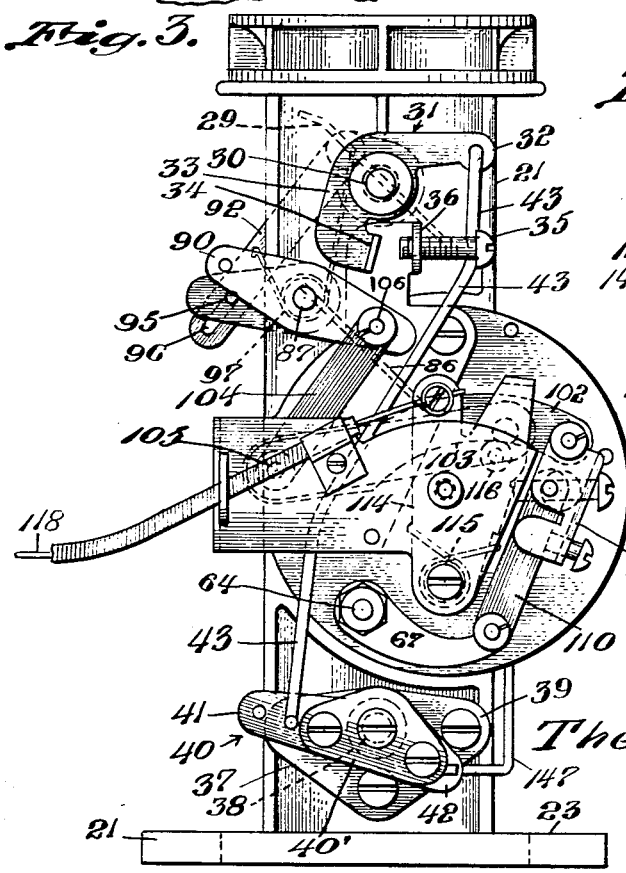
Figure 3 is a view similar to Figure 2 on a larger scale with certain elements omitted to better display the invention.

The flow of air through the conduit 22 is controlled by means of a throttle valve 29 which is mounted on a suitable shaft 30 journalled in opposite side walls of the body 21 at the upper end portion thereof. Both ends of this shaft 30 (see Figure 6) extend beyond the sides of the body, and there is secured to one of said extending end portions a member 31, also Figure 3. This member has an arm 32 extending in a generally horizontal direction and a second arm 33, the outer end portion of which is bent outwardly at generally right angles so as to provide an abutment 34 to engage against an adjustable stop which is shown in the form of a usual machine screw 35. This screw 35 has threaded engagement with a stationary plate 36 at a location to position the end of said screw 35 in the path of movement of said abutment 34. Rocking the member 31 in one or the other direction will move the throttle valve 29 to closed or open position or any intermediate position between these two limits.

A bracket 37 (see Figures 1 and 3) having a stud 38 projecting therefrom is fastened to the body 21 at the lower end portion thereof as by means of screws 39. There is journalled on this stud 38 for rocking motion a crank member 40 having opposite arms 41, 42. A link 43 is attached to the arm 41 and extends upwardly therefrom to be attached to the arm 32. The crank member 40 which includes the plate 40' may be connected to be rocked about its axis of rotation from a remote location, such as the usual accelerator pedal (not shown) by means of a usual linkage (also not shown) connected to the plate 40'. Rocking said crank 40 in one or the other direction will through the link 43 transfer such motion to the member 31 to in turn rotate shaft 30 to move the throttle valve to open or closed position, as previously described. The said throttle valve is biased to move to closed position by means of a torsion spring 44, one arm of which may be positioned to engage an edge of the bracket 37 to be held stationary and the other arm of the spring is attached to the arm 41.

Liquid fuel is ejected under positive pressure into the air flowing through the conduit 22 by means of a fuel ejector unit 45 herein designated as a fuel nozzle (see Figures 9, 13 to 17). This nozzle 45 is mounted to be held within the air flow conduit 22 at a location centrally of said conduit and inwardly of the throttle valve to be on the suction side of the said throttle and the delivery end is arranged for discharge of fuel in the direction of air flow in the conduit.

The nozzle 45 (see Figure 14) has a body 46 provided with chambers 47, 48 between which there extends a wall 49 having holes 49' and a central opening 50 therethrough. Chamber 47, which is the lower chamber, is closed at its lower end by means of a wall 51 having a central opening 52 therethrough and about which there is formed a valve seat 53. An elongated bushing or bearing 54 has a flange 55 at its lower end (see Figure 15) which is provided with radially extending slots 56 which extend on a bias through the said flange. The upper end portion of the bearing 54 is received in the said opening 50 and secured therein as by means of frictional engagement with the walls of said opening. The bearing 54 is of lesser length than the depth of the chamber 47 and depends from the wall 49 with the peripheral edge of the flange 55 engaging the walls of said chamber. The flange is spaced from the wall 51 a substantial distance, providing a separate chamber 57. The opening 52 is controlled by means of a conical member 58 having a stem 59 slidably received in said bearing 54 and passing upwardly into the chamber 48 and there provided with an adjustable sleeve having an abutment shoulder 60. The lower end of the closure 58 extends through the opening 52 and is biased into engagement with the valve seat 53 as by means of a compression spring 61 which is confined between the upper side of said shoulder 60 and a cap 62 which is threadingly secured to the upper portion of the walls of chamber 48 or body 46. The conical closure 58 is raised from the seat 53 against the pressure of the spring 61 by means of a cam 63 which as shown is of a circular shape and may be made integral with a shaft 64 (see Figure 13) which is journalled in a bearing 65 which extends from the nozzle body 46 to pass through the side wall of the body 21. The cam 63 has a sector cut out therefrom providing a radially extending surface 66 which is positioned to engage beneath the flange 60. Turning the shaft 64 in a counter-clockwise direction, as seen in Figure 14, will lift the closure 58 against the pressure of the spring 61 to control the passage of fuel through the opening 52. A crank arm 67 is attached to the shaft 64 by means of which said shaft is turned. Liquid fuel enters chamber 48 by means of a hollow stem 68 (see Figure 13) providing a conduit 69 which opens into the chamber 48. The stem 68 has a threaded portion and projects from the nozzle to pass outwardly through the side of the conduit 22 to be received within a fuel reservoir, to be hereinafter described, and is fastened to a support plate 70' as by means of a nut 70.

The term "liquid fuel" is herein used to define gasoline as it is delivered by the engine pump and prior to its mixture with air.

There is further provided in the nozzle body 46 at the extreme lower end thereof a chamber 71 which in the present disclosure is formed by means of a cup-shaped member 72 having an opening in the lower portion thereof and a flange 74 about the upper edge thereof. The upper side of this flange 74 (see Figure 17) has formed or otherwise provided therein grooves 75 which extend generally tangentially from the cylindrical surface on the inner side of the cup to the peripheral edge of the flange 74. Said member 72 is held in position as by means of the flange portion 74 thereof engaging against the wall 51 and there secured by means of a closure 76 open at both ends and having a shoulder engaging against the flange 74. The closure 76 is threadingly secured to the lower portion of the body 56 as at 77. The bore through the closure 76 is enlarged at the upper end thereof providing an annular chamber 78. The grooves 75 open into this annular chamber 78 which communicate with the atmosphere by means of a conduit 79 formed in the wall of the body 46 and intersecting with a conduit 80 opening to the atmosphere. The conduit 80 is formed by means of a nipple 81 projecting from the body 46 and threadedly engaged by a threaded pipe 82 which extends through the side walls of the body 21 and is there secured in place such as by a nut 83. Air at atmospheric pressure enters the said conduit 80 to pass through the conduit 79 into the chamber 78 and through the grooves 75 to enter chamber 71 in a whirling motion.

The liquid fuel under pressure enters into chamber 48 through the said conduit 69 to pass into chamber 47 and then out thereof through the opening 56 in a whirling motion to enter into chamber 57 also in a whirling motion at a great velocity to be broken up into said chamber into minute particles and further divided by impinging upon the edge of the valve seat 53 to discharge into the chamber 71 into the said mass of whirling air which is at below atmospheric pressure in this chamber to mix therewith and pass out of the chamber 71 in an extremely fine mist to be further mixed and atomized with the air flowing past the nozzle 45 at a yet lower pressure.

In order to coordinate the nozzle valve movement with the changing air flow condition in conduit 22 such as occurs at different engine speeds and loads put thereon, an air volume sensing unit designated generally 85 (see Figures 9, 10, 11, and 12) is provided. This unit comprises a plate or vane 86 which is positioned within the conduit 22 at a location beneath the throttle valve 29 and is of a size to be engageable with three sides of the conduit 22 and is mounted at a marginal edge of the remaining side thereof on a shaft 87 which is journalled in the sides of the body 21. The plate or vane 86 may be rocked about the axis of the shaft 87 to a position which with a baffle 88 will substantially close the conduit 22 to the passage of air therethrough. The shaft 87 extends beyond the walls of the body and carries on these extending portions crank arms 89, 90 which turn with the shaft 87 (Figures 6, 9, 12). There is also mounted on the throttle shaft 30 a similar crank arm 91 to which is pivotally attached a link 92 as at 93 and which extends from the arm 91 to be attached to the arm 89 as by means of a lost-motion connection 94 (see Figure 12) comprising a pivot pin 95 and projecting from the arm 89 to pass through a slot 96 on the said link 92. The vane 86 is biased toward an inoperative position, as shown in Figure 11, upon the closing of the throttle valve 29 by means of a torsion spring 97 (see Figure 4), the body of which encircles the shaft 87 with its arms attached in the usual manner to provide movement of the arm 98 in the proper direction.

In moving the throttle valve 29 to the open position the shaft 30 and the arm 91 connected thereto will be moved in a clockwise direction, as seen in these Figures 9 to 11, inclusive, to move the link 92 upward such that the lower end of the slot 96 engages the pivot 95 and rocks arm 89 and the shaft 87 connected thereto also in a clockwise direction which will swing the vane 86 downwardly to open the conduit 22 to a flow of air therethrough in accordance with the amount of opening of the throttle. The air flowing through the conduit 22 under normal engine suction will move the vane 86 against the spring 97 and the vane 86 will assume a position in which the opposing forces acting on the vane are balanced.

Under engine conditions which would reduce engine suction and thus a reduced velocity and volume of air flow, the vane 86 under the urge of spring 97 will swing towards closed position to assume a position in which the opposing forces acting on the vane 86 are again balanced. Thus, at any throttle opening, the vane 86 at any instant of operation will assume a position in response to the volume of air flow through conduit 22 without effect on the throttle opening as will hereinafter appear.

Referring to Figure 9 the throttle valve 29 is shown open sufficiently to provide for a cruising speed of the engine. The volume of air flowing through the conduit 22 under engine suction will swing the plate 86 downwardly, as previously described, to the position shown in which the air flowing through the conduit will have to pass through a passage 98 defined by the edge 99 of the vane 86 and the adjacent side 100 of the conduit 22. In this position the vane 86 will not appreciably restrict or control the volume of air flowing through the said passage 98 but will merely confine this volume of air to pass through this passage; in other words, the vane 86 operates not to control the flow of air through the conduit 22 but to provide a passage 98 of a size required for the flow of air therethrough in accordance with the volume of the air flow in response to engine suction. The length of the slot 96 is made such as to permit at any given throttle opening the corresponding maximum volume of air flow through the conduit 22; the pin 95 will thus be free to move in slot 96 from a position appropriate to less than maximum air flow to the position for maximum flow without applying any force to the link 92 such as would rock the arm 91 to move throttle 29. The pressure of the air flow through the conduit on the plate 86 will thus not at any position of the plate 86 be such as to transmit motion thereby to the throttle 29 and the throttle valve 29 is balanced against air pressure at any position thereof (that is, at any position of the throttle 29 the air acts thereon equally on opposite sides of the shaft 30). Thus, the maximum opening of the passage 98 may be predetermined at all valve positions. However, upon a drop in velocity of the air flow through the conduit 22 due to reduced engine suction, such as would result on placing a load on the engine, the vane 86 will swing upwardly under the influence of the spring 97 to assume a position to balance this reduced air volume flowing through the conduit 22. Thus, the passage 98 is increased or decreased in accordance with the velocity or volume of air flowing through the conduit 22 independent of the throttle valve position and without affecting the throttle valve. If (with reference to Figure 9) the throttle is moved to a further open position, such movement will carry link 92 further upwardly, the link 92 riding on the pin 95, and space the upper end of the slot 96 relative to pin 95 to permit movement of the vane 86 to assume a position for maximum air flow through the conduit 22 for the new throttle opening. Thus, the vane 86 is moved in direct relation to the volume of air flowing through the air conduit 22 and serves as a means for sensing the air flow through the conduit 22. The vane 86 will also be sensitive to any changes in air density and will move in response to any changes in air density as well as changes in volume thereof.

The movement of the vane 86 is transmitted to the valve closure 58 by means of a linkage designated generally 101 (see Figures 3 and 4) and which comprises a lever 102 having an arcuate lower surface 103. A link 104 is pivotally connected as at 105 to the lever 102 and as at 106 to the arm 90 attached to the shaft 87. The lever 102 is also pivotally attached by means of the pivot 105 to a rockably mounted support 107 which is pivotally mounted as at 108 to a mounting plate 109. Thus rocking the support 107 by link 104 will carry the pivoted end of the lever 102 therewith. An adjustable link 110 is pivotally connected as at 111 and 112 to the lever 102 and the arm 67 on the shaft 64, respectively. The surface 103 engages a fulcrum designated generally 113 about which said lever 102 is rocked. Upon the opening of the throttle valve 29 the sensing plate or vane 86 will be moved by the link 92 to open position, and the vane 86 will assume a position in response to the air flow past the throttle. When the engine is loaded as may occur on rapid acceleration or when the vehicle is climbing steep hills, the air flow through conduit 22 will lessen through reduced engine suction and the spring 97 will under such conditions exert a force on the vane 86 in a direction to move the same to assume a position in relation to the volume of air passing through the conduit 22. This vane 86 will also be effective in its movement according to the density of the air passing through said conduit 22. This movement of the vane 86 will through the compound linkage previously described move the closure 58 of the fuel nozzle 45 from its seat 53 a distance predetermined by the amount of opening of the said throttle to permit a proper portion of the liquid fuel under pressure to pass through the opening 52 into the chamber 71 to mix with the air therein and thereafter project the mixture through the opening 73 into the air flow in said conduit in a ratio predetermined by the adjustment and sizes of the openings through which this fuel passes. Assuming a load being placed upon the engine, such as when the vehicle is climbing a hill, the engine suction will be reduced with a corresponding lesser velocity and volume of air flow in conduit 22. The pressure of this air on the vane 86 will likewise be reduced and the said vane under the urge of the spring 97 will move to a position to balance the air pressure and spring pressure acting thereon, which movement will decrease the size of the passage 98 to that required for the passage of the reduced volume of air flow in conduit 22 without any restriction to the flow of said air. This movement of the vane 86 will, as previously described, cause a proportional movement of the closure 58 whereby to decrease the discharge of fuel into the reduced volume of air so as to maintain the predetermined ratio of gasoline and air mixture.

The fulcrum 113 about which the lever 102 is rocked is a shiftable fulcrum and has an arm 114 which is rockably supported on a stationary shaft 115 which projects from the plate 109. A roller 116 having a flange 117 is rotatably mounted on the arm 114 at the upper portion thereof and the lever 102 extends between the said flange 117 and the adjacent side of the arm 114 with the lower arcuate surface 103 resting upon the roller 116. The said arcuate surface 103 is generated on an arc of a circle whose radius is equal to the radius of the arc of movement of the roller 116. The arm 114 is connected by any suitable means, such as a wire 118 (Fig. 3), to a thermostatic device (not shown) which may be attached in any convenient location on the engine to be affected and moved and thereby rock said arm 114 in one or the other direction upon the shaft 115 depending upon the temperature of the said engine. When the engine is cold, the thermostatic device will operate to move the arm 114 and shift the roller 116 along the surface 103 towards the pivot 105 to increase the movement of the lever 102, thereby to provide a greater movement of the arm 67 in response to movement of the throttle. Upon the engine attaining the normal running temperature, the thermostat will be activated to move the arm 114 in the other direction to cause a corresponding movement of the arm 67, thereby moving the closure 58 towards closed position to decrease the amount of liquid fuel discharged from the nozzle 45. It will thus be apparent that by shifting the fulcrum 113 in response to engine temperature, the fuel mixture may be enriched or made more lean according to engine demand. An adjustable stop 119 is provided for engaging the arm 114 to provide for adjusting the device for different engine characteristics. The link 110 is constructed so as to provide for an idling fuel adjustment and is made in two sections 120, 121 which are pivotally secured to each other as at 122 for relative movement. An adjusting screw 123 is threadingly received in the section 120 and extends into engagement with the section 121. Turning the screw 123 in a clockwise direction will swing the upper section 116 outwardly to cause a shortening of the effective length of the link 110 thereby lifting the arm 67 to move the closure 58 of the fuel nozzle to adjust the opening 52 to provide for sufficient fuel to maintain the engine running at idling speed. Turning the screw 123 in the opposite direction will cause the sections to move inwardly to in effect increase the length of the link 110 and thereby move the arm 67 downwardly, as viewed in Figure 4, to decrease the effective size of the opening 52 in the fuel nozzle. An adjustment for idling is thus provided by which minute or vernier-like increments may be made for idling speeds of the engine. Since this adjustment merely lengthens or shortens the effective length of the link 110, the idling adjustment has little or no effect on any preset adjustment of the device for normal engine running condition at the higher speed. At the higher speeds the screw 35 may be adjusted to permit greater or lesser throttle movement, as may be desired, with a corresponding wider opening of fuel nozzle. This adjustment of fuel discharge at the upper speed is likewise not carried to the lower engine speeds. Since the nozzle 45 is positioned on the suction side of the throttle, the chamber 71 will be subjected to engine intake manifold reduced pressure through discharge opening 73 as well as to atmospheric pressure at the intake air, as previously described. This will cause a pressure differential to exist within said chamber 71, which will vary according to engine loads. In order to control the pressure differential within said chamber, a second valve closure 124 is provided and arranged to be moved with closure 59 such as by attaching the said closure 124 to the end portion of closure 59 to be moved thereby to or from said opening 73. Thus, at nearly closed position of the closure 58 of the fuel nozzle 45, the valve closure 24 will have likewise been moved to nearly closed position relative to said opening 73 to prevent and minimize the suction action of the engine to draw or suck fuel from the chamber 71 through said opening 73. This valve member 124 is so related to the opening 73 as to control the effective size thereof in proportion to the effective size of the opening 52. Thus, at the lowest engine speed the closure 124 will be so related to the opening 73 and thereby control the said pressure differential so that little, if any, fuel may be sucked out from chamber 71 other than what is ejected therethrough under pressure.

The fuel reservoir 125 and the nozzle 45 (see Figures 7 and 13) are secured to each other to form a unit to be added or removed bodily as a unit from the body 21 and which unit is secured in place as by screws. The reservoir comprises a chamber 126 having an inlet 127 (see Figures 8 and 12) which may be connected by any suitable conduit (not shown) to the engine pump (not shown). A manually operable pump 128 (Fig. 7) is built or otherwise provided within the chamber 126 and has a pump cylinder 129 closed at the lower end and opening at the upper end thereof into the chamber 126. The lower end of the cylinder 129 communicates with the inlet 127 (Fig. 8) by means of a conduit 130 controlled by a valve closure 131 spring biased for movement to closed position. The pump piston 132 (Fig. 7) is open at the top and has a one-way fuel passage 133 therethrough which is controlled by spring-pressed check valve 134. The piston chamber is separated from the lower portion of the cylinder by a wall 135 also having a fuel opening 136 therethrough which is controlled by a similar spring-pressed check valve 137. Fuel entering under pressure from the fuel reservoir will pass freely through the opening 136, 133 and into the chamber 126 but will be prevented from reverse flow by means of the said check valves 134, 137 operating in the usual manner. The pump 128 is manually operated by means of a crank 138 which is connected by a link 139 to the piston 132. The body 138' of the crank 138 extends through the wall of the reservoir and is journalled in a bearing 140 (Fig. 6) which is sealed to the atmosphere and extends beyond this bearing to be journalled in the said plate 109. There is mounted on the body of the crank 138 (see Fig. 5) spaced resilient arms 141, 142 (Fig. 5) which may be formed as shown by means of a coil spring 142' (Fig. 6) tightly embracing the said body 138' with the free ends thereof extending therefrom, as shown in Figure 5, so as to move therewith and to yield under force applied thereon. A second crank 143 having arms 144, 145 is mounted to the arm 145 for free rotational movement on the body 138' adjacent to the coil 142'. The arm 144 thereof extends between the arms 141, 142. The arm 145 has an eye formation 146 at the end thereof which is fastened to a link 147 that extends therefrom to be attached to the arm 42 of member 40. When the said accelerator pedal (not shown) is pressed, the motion thereof will be transmitted through the arm 42 and link 147 to turn crank 143 for its arm 144 to rock the crank 138 through arm 141 to reciprocate the piston plunger. Thus, the pump 128 may be operated at the start of the engine cranking to provide within the chamber 126 the required fuel pressure. When said pressure has been reached, further movement of the accelerator pedal on the crank 143 will be transmitted and absorbed in the resiliency of the arms 141, 142 without moving the said piston 132.

Figure 8:
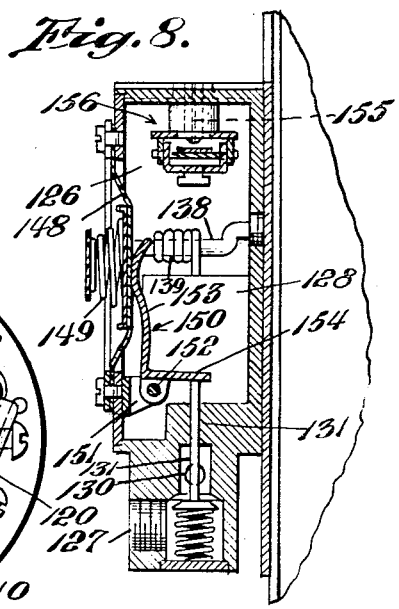
Figure 8 is a sectional view taken substantially along line 8—8 of Figure 7.

The fuel pressure within the chamber 126 is controlled by means of a pressure operated device comprising a pulsating diaphragm 148 (see Figures 8 and 12) which acts against a compression spring 149 pre-set to apply the required resistant force to the outward movement of the diaphragm 148 under the pressure of the fuel contained within the chamber 126. A valve actuating member 150 is pivotally mounted to a support bracket 151 as at 152 and has an arm 153 which extends upwardly into engagement with the diaphragm 148 substantially centrally thereof and has another arm 154 which extends into engagement with the upper end of the valve closure 131. As the diaphragm moves inwardly upon a decrease in pressure within the chamber 126, the member 150 will be rocked about its pivot 152 in a clockwise direction, as seen in Figure 8, to move the closure 131 from its seat against the action of the spring acting thereon so as to open the conduit 130 to the flow of gasoline from the engine pump. Upon the pressure being built within the reservoir 126 the diaphragm will be moved in the opposite direction against the action of the spring 149 and the valve closure 131 under the pressure of its spring will be moved to the closed position to close the conduit 130 to the flow of gasoline therethrough. The diaphragm 148 also provides for dampening pulsation of the fuel in the chamber 126.

In order to free the reservoir of excess air which may enter therein, a vent opening 155 is provided and this is controlled by means of a valve arrangement designated generally 156 (see Fig. 7) comprising a support 157 to which there is pivotally attached an arm 158, on the end of which there is secured a float 159. A closure 160 for engagement with the vent opening 155 is carried on a plate 161 which is pivotally secured as at 162 to the support 157 to extend therefrom into slidable engagement with the arm 158. Thus, a compound leverage arrangement is provided whereby a large movement of the float will provide a relatively smaller movement of the said closure plate 161. With the reservoir empty of gasoline, or nearly so, the float will have moved to swing the arm 158 in a downward direction, as seen in Figure 7, to carry therewith the arm 161 and the closure 160 carried thereby to open the opening 155 to the atmosphere. Upon fuel entering the said chamber 126 the float will rise therewith and will move the closure 160 toward the said opening 155 which, upon the gasoline having reached the predetermined level at the predetermined pressure, the said closure will then be in engagement with the edge of the opening 155 to close the same to the atmosphere.

I claim:

1. A fuel atomizer for an internal combustion engine comprising an air flow conduit adapted to be attached to the intake manifold of the engine to provide a flow of air through said conduit by means of engine suction, a throttle for controlling the flow of air through said conduit, a fuel nozzle in said conduit through which fuel is discharged into the said flow of air, an air flow sensing member positioned within said conduit at a position inwardly of the throttle to be moved by said air flow in amounts responsive to the volume of air flowing through said conduit, a rotatable shaft, said member being mounted on said shaft for rocking movement therewith, means operatively connecting said shaft to said throttle for movement of said member and throttle in unison and for movement of said member independent of said throttle, and means operatively connecting said shaft to said nozzle for controlling the discharge of fuel through said nozzle in response to the movement of said member at a predetermined ratio to the volume of air passing through said conduit.

2. A fuel atomizer as set forth in claim 1 wherein said conduit is rectangular in cross section and said air sensing member is a vane resiliently mounted at one marginal edge thereof within said conduit beneath the throttle for rocking movement and of a size and shape to conform to the cross section of said conduit whereby the effective air flow on said vane will be substantially all to one side of said marginal edge.

3. A fuel atomizer as set forth in claim 1 wherein said air sensing member is a vane resiliently mounted for rocking movement within said conduit beneath the throttle and connected thereto by means of a lost motion connection which includes a pin and slot connection.

4. A fuel atomizer as set forth in claim 1 wherein the fuel nozzle is positioned wholly within the said conduit and with the delivery end of said nozzle positioned to discharge fuel under pressure from said fuel nozzle in the direction of the air flow through the conduit.

5. A fuel atomizer as set forth in claim 1 further comprising valve means for controlling the discharge of fuel under pressure from said nozzle and a compound linkage operatively connecting said air sensing member to said valve means.

6. A fuel atomizer for an internal combustion engine comprising an air flow conduit adapted to be attached to the intake manifold of the engine to provide a flow of air through said conduit by means of engine suction, a throttle for controlling the flow of air through said conduit, a fuel nozzle in said conduit through which fuel is discharged under pressure into the air flowing through said conduit, a spring pressed valve in said fuel nozzle for controlling the flow of fuel through said nozzle, and means for controlling said valve including an air flow sensing member operatively connected to said valve for moving the same and positioned within said conduit to be yieldingly moved by the said air flow to provide a restricted passage therefor past said member in accordance with the amount of air flowing through said conduit, and resilient means for providing a predetermined yielding opposing force on said member to predetermine the position of said member according to the volume of air flowing past said member said member being connected to and initially moved to open position by the opening of said throttle.

7. A fuel atomizer for an internal combustion engine comprising an air flow conduit adapted to be attached to the intake manifold of the engine to provide a flow of air through said conduit by engine suction, a throttle for controlling the flow of air through said conduit, a fuel nozzle in said conduit, means for discharging fuel through said nozzle at a pressure above atmospheric, an air sensing member positioned within said conduit and connected to said throttle for initial opening movement therewith and movable independent thereof, a linkage connecting said member to said nozzle, said member being movable in a response to changes in the volume of air flowing through said conduit for controlling the discharge of fuel through said nozzle at a predetermined ratio relative to the volume of air flowing through said conduit, and thermostatically operable means connected to said linkage operable to vary the said ratio in response to engine demand.

8. A fuel atomizer for an internal combustion engine comprising an air flow conduit adapted to be attached to the intake manifold of the engine to provide a flow of air through said conduit by means of engine suction, a throttle for controlling the flow of air through said conduit, a fuel nozzle in said conduit having an opening through which fuel is discharged into said flow of air, valve means for controlling the discharge of fuel through said opening, an air sensing member pivotally mounted in said conduit at a position to be within said conduit and swung about its mounting by the said flow of air, resilient yielding means for opposing movement of said member and means operatively connecting said member to said valve means and to said throttle for initial opening movement in unison with said throttle and movable independently of said throttle in response to the flow of air through said conduit to move said valve means to control the discharge of fuel through said opening at a predetermined ratio to the volume of air passing through said conduit.

9. A fuel atomizer for an internal combustion engine comprising an air flow conduit, a throttle valve in said conduit, a fuel nozzle discharging in said conduit, a fuel regulating valve, resilient means urging said fuel regulating valve to closing position, a vane pivotally supported in said conduit between the throttle valve and nozzle and arranged in said conduit for the air flow to engage substantially all at one side of the pivotal mounting thereof, a linkage means connecting said vane to said throttle valve for initial opening movement therewith and for movement independently thereof, means connecting said vane to said fuel regulating valve whereby flow of air against said vane tends to move the same towards open position and open said fuel regulating valve, and second resilient means urging the vane in a closing direction.

10. A fuel atomizer for an internal combustion engine comprising an air flow conduit, a throttle valve in said conduit, a fuel nozzle discharging in said conduit, a fuel regulating valve, resilient means urging said valve to closing position, a vane pivotally supported in said conduit between the throttle valve and nozzle and arranged in said conduit for the air flow to engage substantially all at one side of the pivotal mounting thereof, means connecting said vane to said throttle valve for initial opening movement therewith and for movement independently thereof, means connecting said vane to said fuel regulating valve whereby flow of air against said vane tends to move the same towards open position and open said fuel regulating valve, and resilient means urging the vane in a closing direction, said vane being pivotally supported at one marginal edge thereof at one side of the conduit whereby the flow of air through said conduit will be all to one side of said vane.

11. A fuel atomizer as set forth in claim 9 wherein thermostatically operable means connected to said fuel regulating valve is operable to move the same towards open position in response to engine demand.

12. A fuel atomizer for an internal combustion engine comprising an air flow conduit, a throttle valve in said conduit, a fuel regulating needle valve, resilient means urging said needle valve to closing position, a vane pivotally supported in said conduit between the throttle valve and nozzle, means connecting said vane to said throttle valve for initial opening movement therewith and for movement independently thereof, and second means connecting said vane to said needle valve whereby flow of air against said vane tends to move the same towards open position and open said needle valve, said second means including a linkage having a rockable lever, a shiftable fulcrum for said lever, and means for moving said fulcrum to change the effective length of said lever to vary the amount of opening movement of the needle valve in response to movement of said vane.

13. A fuel atomizer as set forth in claim 12 wherein the means for moving the said shiftable fulcrum is thermostatically controlled.

References Cited in the file of this patent

UNITED STATES PATENTS

| | | |
|---|---|---|
| 1,802,321 | Mabee et al. | Apr. 21, 1931 |
| 1,933,379 | Mock | Oct. 31, 1933 |
| 2,014,907 | Myers | Sept. 17, 1935 |
| 2,126,132 | Paasche | Aug. 9, 1938 |
| 2,238,333 | McCain | Apr. 15, 1941 |
| 2,283,021 | Udale | May 12, 1942 |
| 2,345,168 | Wirth et al. | Mar. 28, 1944 |
| 2,378,036 | Reggio | June 12, 1945 |
| 2,447,261 | Mock | Aug. 17, 1948 |
| 2,584,911 | Orr | Feb. 5, 1952 |